Patented Aug. 8, 1933

1,921,726

UNITED STATES PATENT OFFICE 1,921,726

TREATMENT OF REACTORS

Edgar C. Britton, Midland, Mich., assignor to The Dow Chemical Company, Midland, Mich., a Corporation of Michigan No Drawing. Application September 17, 1931
Serial No. 563,461

7 Claims.  (Cl. 23—1)

The present invention concerns a new method of treating iron and steel apparatus so as to render the same resistant to corrosion and relatively inactive with respect to the usual tendency of iron to displace copper from cuprous compounds in ammoniacal solutions. Such treatment is particularly advantageous when said apparatus is to be employed as a reactor in a process for preparing a hydrocarbon amino compound through heating the corresponding hydrocarbon chloro compound with ammonia or ammonium hydroxide in the presence of a cuprous compound as catalyst.

In the following discussion I set forth the steps which led to the present invention and a preferred mode of procedure for employing the principle of the same. It is to be understood, however, that such mode of procedure is illustrative of but one of the several ways in which said principle may be employed and is not to be construed as a limitation on the invention.

An iron bomb which had been cleaned thoroughly by washing the same successively with dilute hydrochloric acid, water and acetone was dried and charged with a mixture consisting of 200 grams (3.18 moles) of aqueous 27 per cent ammonia solution, 102 grams (0.91 mole) of monochloro-benzene and 11.1 grams of ammonio-cuprous chloride, $Cu(NH_3)Cl$. The sealed bomb was heated to 225° C. for 3 hours. From the reaction mass there was obtained only 25 per cent of the theoretical yield of aniline. Approximately 75 per cent of the monochloro-benzene employed was recovered as the unreacted material and it was noted that free copper had been liberated from the ammonio-cuprous chloride catalyst and that the bomb itself was corroded to a considerable extent. In order to determine the cause for the production of aniline in such low yield by reacting the aforementioned materials under conditions which had been known on other occasions to give rise to the formation of said amine in yields of 90 per cent of theoretical or higher, the aforementioned bomb was employed in making two successive runs using the previously mentioned reactants in the amounts stated, but employing nitrogen in the first run and gaseous ammonia in the second to sweep air from above the reaction mixture before sealing and heating the bomb. Low yields of aniline were produced in each of the two last mentioned runs and a considerable corrosion of the bomb as well as a deposition of free copper was also noted in each instance. The production of aniline in low yield was, therefore, not due to the action of air present in the bomb during the reaction period, but was probably due to the action of iron on the catalyst employed.

During the course of my investigations, I observed the fact that reuse of the same bomb as a reactor for the aforementioned ammonolysis reaction, with washing of the bomb with noncorrosive solvents only, after each run, tended to enhance the production of aniline in higher yields, to decrease corrosion of the bomb itself and to decrease the tendency of iron present to displace copper from the cuprous compound employed as a catalyst. I believe such improved results to be due to the inner surface of the iron reactor being rendered passive through the action of ammonia itself. In order to test my theory, the same bomb in which aniline had been formed in the aforementioned low yields was washed successively with dilute hydrochloric acid, water, and acetone, dried, and then charged with 200 grams of aqueous 27 per cent ammonia solution and heated to about 225° C. for 3 hours. The bomb was then cooled, emptied and recharged with a mixture consisting of 200 grams of aqueous 27 per cent ammonia solution, 102 grams of monochloro-benzene and 11.1 grams of ammonio-cuprous chloride. The recharged bomb was heated to 225° C. for 3 hours, cooled and emptied. From the reaction mass, aniline was isolated in 90 per cent of the theoretical yield and no deposition of free copper or corrosion of the bomb itself was observed to have taken place. Several new bombs were then each charged with ammonium hydroxide (27 per cent ammonia) and heated at 225° C. or thereabout for a period of 3 hours. Upon recharging each of the so treated bombs with a mixture consisting of a halogenated aromatic hydrocarbon, aqueous ammonium hydroxide solution and a cuprous compound, in molecular proportions corresponding to those previously stated, and heating each bomb to a temperature between 200° and 250° C. for a 3 hour period, it was found that amino compounds such as alpha-naphthylamine, benzidene, etc., could be prepared in yields far higher than was possible when a similar operation was carried out using new, untreated iron bombs as reactors.

The present invention, then, consists in a new method of treating iron and steel apparatus so as to render the same resistant to corrosion by ammonium chloride and cuprous compounds in the presence of ammonia and relatively inactive with respect to the characteristic tendency of iron to displace copper from said cuprous compounds.

My new method of treating iron and steel apparatus is advantageous not only in that it reduces the corrosive action of the previously mentioned reactants on such apparatus, but also in that said treatment reduces the tendency of iron and steel to displace copper from the cuprous compounds ordinarily employed as catalysts in reactions for the ammonolysis of halogenated hydrocarbons and thereby assures the full effectiveness of the catalysts and maximum yield of the desired products.

My invention may be practiced in ways other than those previously mentioned. Iron and steel apparatus may, for instance, be heated with aqueous ammonia under superatmospheric pressure and at any temperature above 200° C. so as to render the same resistant to corrosion and relatively inactive with respect to the usual tendency of iron to displace copper from cuprous compounds, e. g. cuprous oxide, ammonio-cuprous chloride, etc. During employment of my method of treating iron and steel apparatus, temperatures high enough to distort or materially injure the apparatus itself will naturally be avoided. Ordinarily, temperatures between 200° and 400° C. may be employed.

Other modes of applying the principle of my invention may be employed instead of those explained, change being made as regards the method herein disclosed, provided the means stated by any of the following claims or the equivalent of such stated means be employed.

I therefore particularly point out and distinctly claim as my invention:—

1. A method of obtaining the full catalytic effect of the cuprous compounds used as catalysts in reactions for the ammonolysis of halogenated hydrocarbons, which comprises rendering the iron and steel apparatus, employed as a reactor for such ammonolysis reactions, passive, with respect to the usual tendency of iron to displace copper from cuprous compounds, through heating said apparatus with aqueous ammonia, in the absence of a copper compound under superatmospheric pressure and at a temperature between about 200° and about 400° C.

2. In methods of ammonolysis employing cuprous oxide as catalyst and an iron surfaced container as a reactor, the step which consists in treating the mentioned iron surface with ammonia in the presence of water and in the absence of a cuprous compound, under superatmospheric pressure and at a temperature between 200° and 400° C. to render such surface passive to said catalyst.

3. In methods of ammonolysis employing ammonio-cuprous chloride as catalyst and an iron surfaced container as reactor, the step which consists in treating the mentioned iron surface with ammonia, in the presence of water, under superatmospheric pressure, at a temperature between 200° and 400° C. and for a period of 3 hours or longer, to render such surface passive to said catalyst.

4. A method of treating iron and steel apparatus before exposure to solutions containing cuprous salts which comprises subjecting said apparatus to the action of aqueous ammonia under superatmospheric pressure and at a temperature above 200° C. for a period of 3 hours or longer, thereby rendering said apparatus passive to such salts.

5. A method of rendering iron passive toward the corrosive action of a mixture such as that employed for the ammonolysis of a halogenated hydrocarbon which comprises heating the iron under pressure with ammonia in presence of water and in the absence of a cuprous compound, at a temperature between about 200° and about 400° C.

6. A method of treating an iron or steel apparatus used for reactions employing an ammoniacal solution of a cuprous compound, to increase the corrosion-resistance of surfaces thereof exposed to contact with such solution, which comprises charging said apparatus with an aqueous ammonia solution substantially free from copper compounds and heating the charge under superatmospheric pressure to a temperature between about 200° and about 400° C.

7. A method of treating an iron or steel apparatus used for reactions employing an ammoniacal solution of a cuprous compound, to increase the corrosion-resistance of surfaces thereof exposed to contact with such solution, which comprises charging said apparatus with an aqueous ammonia solution substantially free from copper compounds and heating the charge under superatmospheric pressure to a temperature between about 200° and about 400° C. for a period of at least three hours.

EDGAR C. BRITTON.